June 28, 1960 H. C. RISING ET AL 2,942,430
APPARATUS FOR FREEZING ICE BLOCKS
Filed Aug. 30, 1955 5 Sheets-Sheet 1
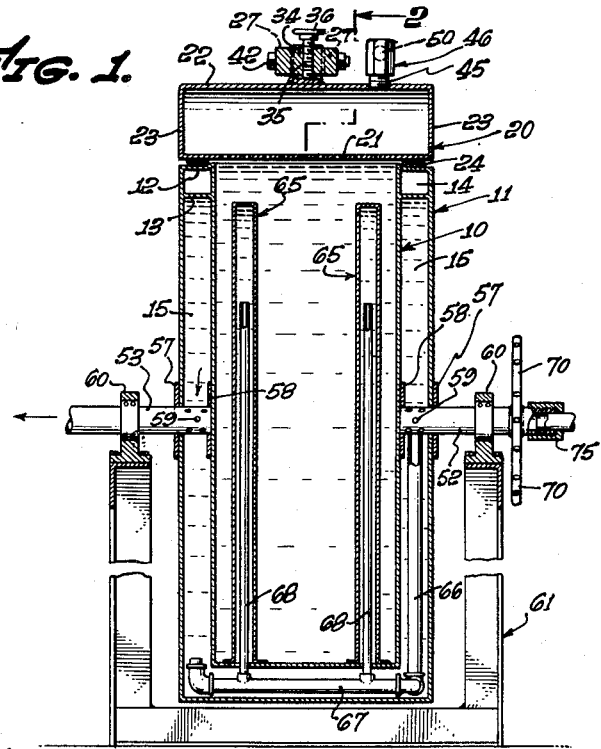
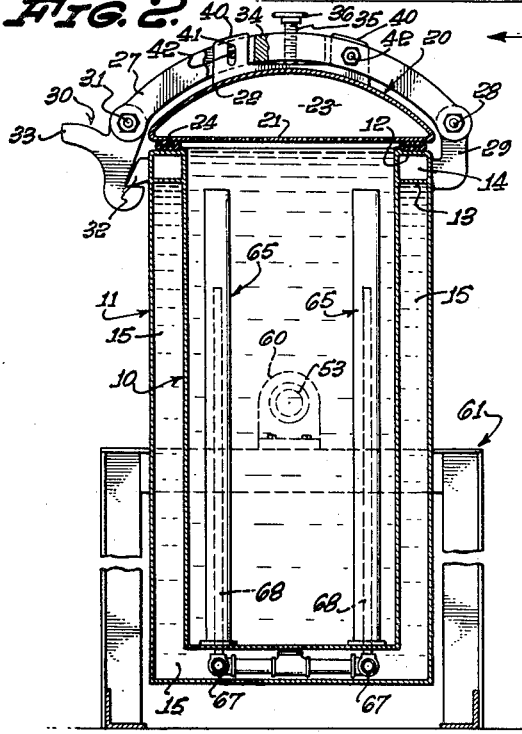
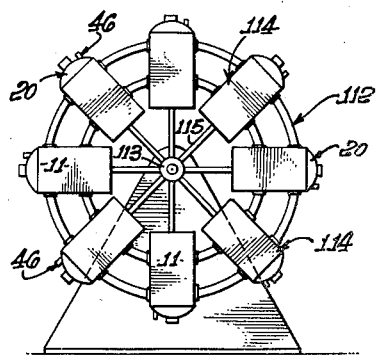
INVENTORS,
HENRY C. RISING,
JOHN SHERIFF
BY
ATTORNEY.

June 28, 1960
H. C. RISING ET AL
2,942,430
APPARATUS FOR FREEZING ICE BLOCKS
Filed Aug. 30, 1955
5 Sheets-Sheet 2
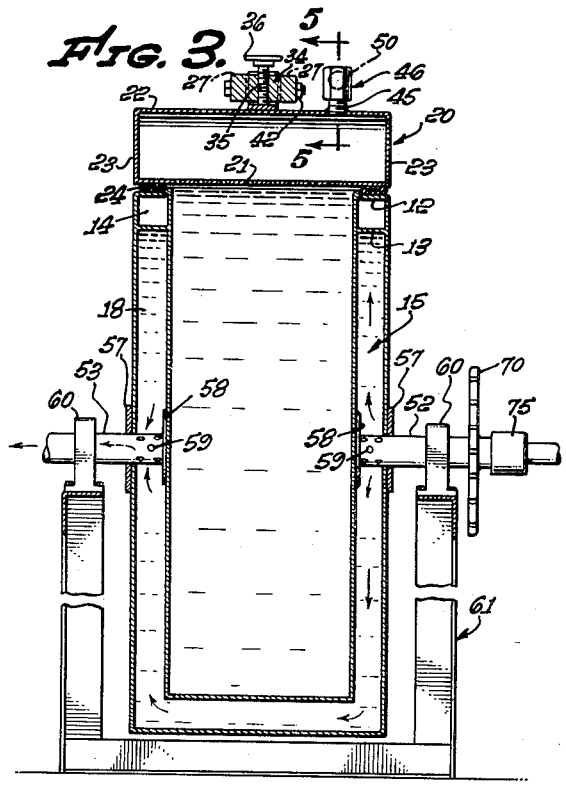
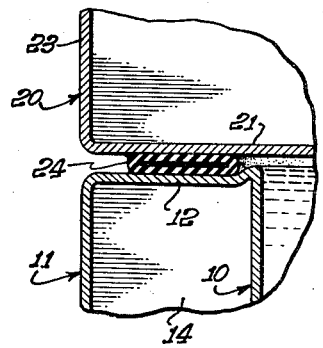
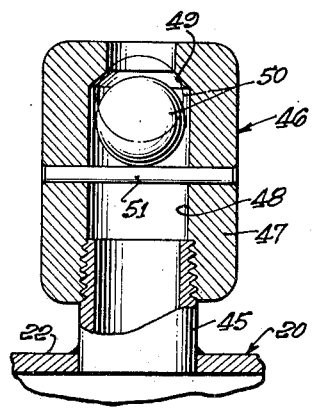
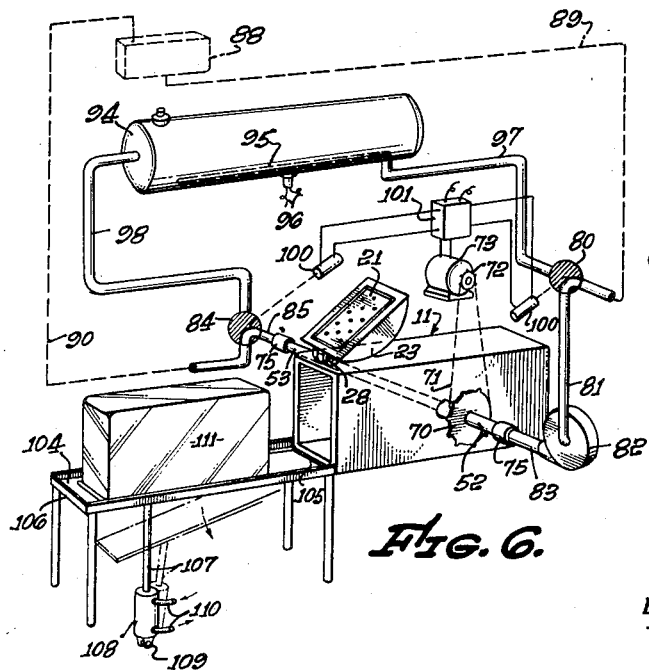
INVENTORS,
HENRY C. RISING
JOHN SHERIFF
BY
ATTORNEY June 28, 1960  H. C. RISING ET AL  2,942,430
APPARATUS FOR FREEZING ICE BLOCKS
Filed Aug. 30, 1955  5 Sheets-Sheet 3

INVENTORS
HENRY C. RISING
JOHN SHERIFF
BY
ATTORNEY

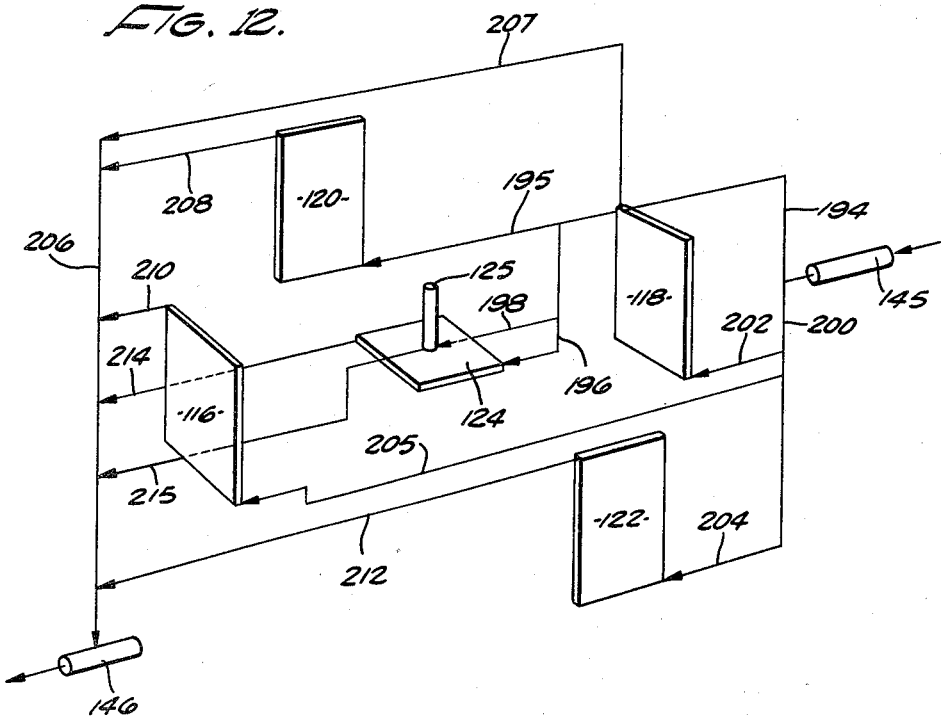
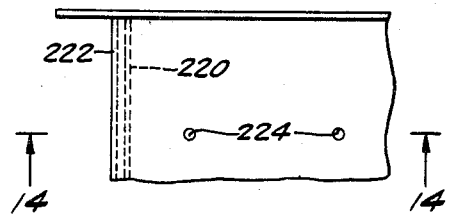
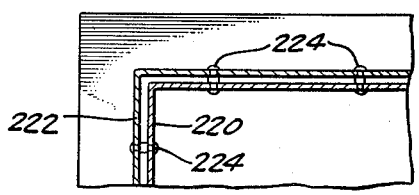
INVENTORS
HENRY C. RISING
BY JOHN SHERIFF
ATTORNEY June 28, 1960  H. C. RISING ET AL  2,942,430
APPARATUS FOR FREEZING ICE BLOCKS
Filed Aug. 30, 1955  5 Sheets-Sheet 5
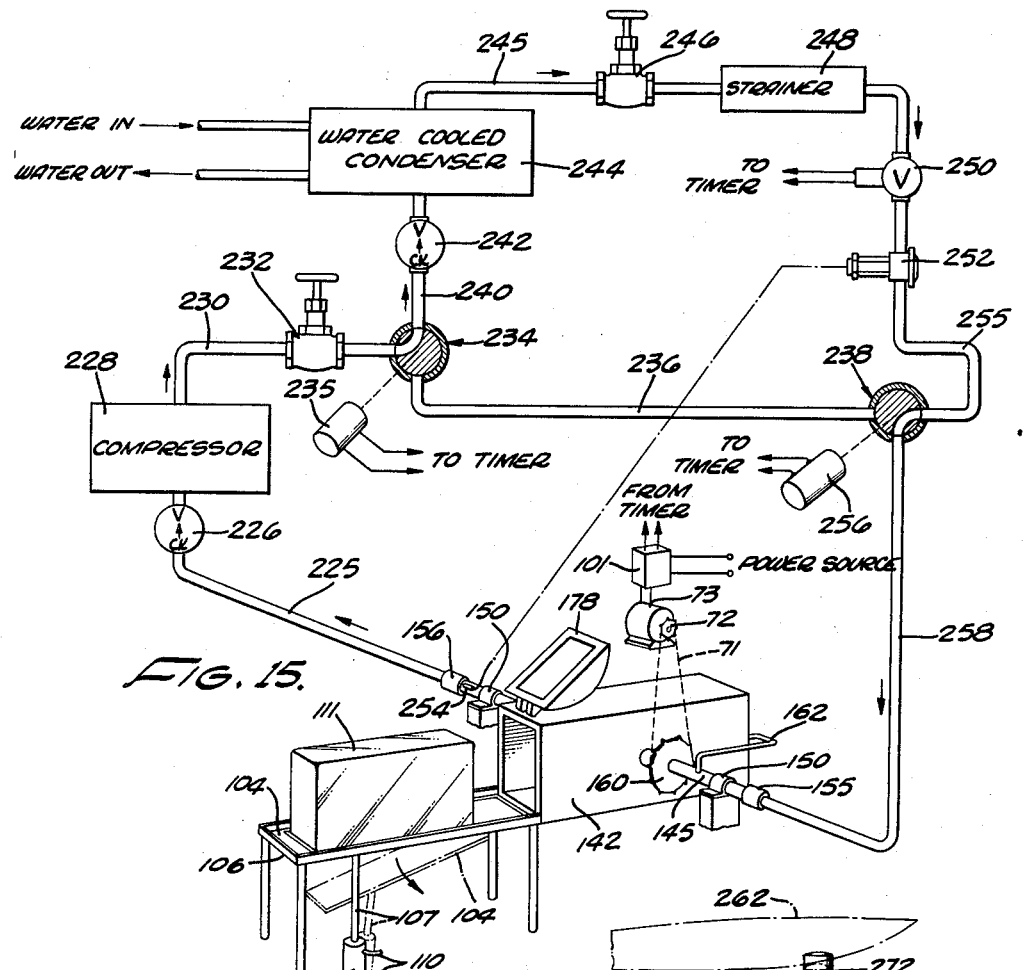
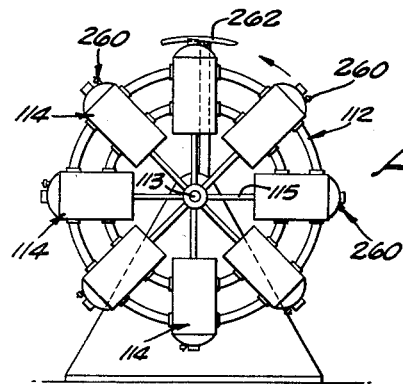
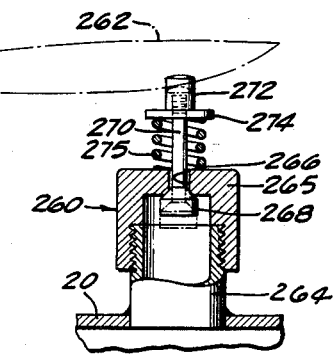
INVENTORS
HENRY C. RISING
JOHN SHERIFF
BY
ATTORNEY

United States Patent Office 2,942,430
Patented June 28, 1960

2,942,430

APPARATUS FOR FREEZING ICE BLOCKS

Henry C. Rising, 863 E. Mountain St., Glendale, Calif., and John Sheriff, 2706 S. Robertson Blvd., Los Angeles, Calif.

Filed Aug. 30, 1955, Ser. No. 531,466

6 Claims. (Cl. 62—66)

Our invention relates to methods and devices for freezing relatively large solid blocks of ice as distinguished from relatively small bodies of ice such as ice cubes. This application is a continuation-in-part of our copending application of the same title, S.N. 388,378, filed October 26, 1953, now abandoned.

One of the important objects of the invention is to produce large blocks of ice with exceptional rapidity and economy. This object is attained by special attention to the fact that the rate of heat flow between two points varies directly with the difference in temperature between the two points and varies inversely with the resistance to heat flow between the two points. In the usual freezing process, there is initially a relatively large temperature drop between the temperature of the water that is to be frozen and the temperature of the refrigerant. Also, the path of the heat flow is short, being merely the thickness of a thin metal wall, and, of course, the resistance of the metal wall to heat flow is relatively small. Initial heat flow from the water to the refrigerant is, therefore, rapid. As soon as the heat flow starts, however, the temperature of the water immediately adjacent the separating wall begins to fall, the temperature of the refrigerant immediately adjacent the other side of the separating wall begins to rise, and the consequent lowering of the temperature difference between the two sides of the separating wall reduces the rate of heat flow through the wall. Further reduction in the rate of heat transfer results from any formation of bubbles on either side of the wall or any formation of gaseous film, since the resistance to heat flow on the part of the gaseous fluid may be many hundred times the resistance of the same thickness of metal.

The present invention achieves rapid freezing by continually agitating the water in a highly effective manner to create turbulence for continually replacing relatively cold water with relatively warm water at one surface of the separating wall and by forced circulation of the refrigerant at relatively high velocity along the other surface of the separating wall. As a result of turbulence in the body of water and relatively high velocity circulation of the refrigerant a maximum temperature drop across the separating wall is maintained for maximum rapidity of heat exchange between the liquid and the refrigerant. The turbulence of the water on one side of the wall and the relatively high velocity flow of the refrigerant on the other side of the separating wall prevents the formation of bubbles and air films on either surface of the separating wall.

The problem of providing agitation in the water immediately adjacent the wall is that any mechanical means immersed in the water for this purpose will be incorporated into the frozen ice block. The invention solves this problem by confining the water to be frozen in a suitable container and continually changing the position of the container relative to the vertical in such manner that the inertia of the confined water results in the desired agitation. While various kinds of motion may be used to produce the desired result, either reciprocative rotation, i.e., oscillation about an axis of rotation or simple continuous rotation of the water-containing receptacle is preferred.

A further important object of the invention is to produce high quality ice that is clear, free of bubbles, and uniformly solid throughout. A special object of the invention in this respect is to avoid the usual formation of a mushy region near the upper end of the ice block which results from the conventional procedure of freezing water into a block in a stationary container submerged in a body of cold brine.

In one practice of the invention, this further object is achieved, in part, by subjecting the body of water in the container to a certain surge action through a perforated baffle during the freezing period. Since the body of water continuously seeks the lowest region of the container thereby forcing the air to the highest region of the container, the continual reversal of the container by its rotation causes the body of water and the body of air to reciprocate continually from end to end of the container, the water and air passing each other through the perforated baffle on each reciprocation. A vent action to cooperate with the surge action is achieved by providing a suitable vent in one end of the revolving container and by providing means to open the vent automatically when the vent end of the container is uppermost and to close the vent at other positions of the container to prevent the escape of the liquid.

In a second practice of the invention this further object of obtaining a clear block of ice without a mushy region is attained by evacuating air from the container in preparation for the freezing operation, the evacuation step being carried out after the body of water is placed in the container. This evacuation not only removes free air above the liquid body but also serves to remove air that is dissolved in the water. Thus substantially no air remains inside the container to interfere with the turbulence of the water that is created by continually changing the position of the container.

Further objects in the preferred practice of the invention relates to the release and discharge of the frozen product at the end of the process cycle. It is desirable to free the ice block from the container without loss of time and it is further desirable to provide for unloading the block of ice from the container in a rapid and labor-saving manner. In this regard, a feature of the preferred practice of the invention is the replacement of the refrigerant in the hollow wall of the container by a relatively warm fluid at the end of the freezing process to cause sufficient superficial thawing to free the ice block.

Another feature of the invention in this respect is the rotation of the container to a position for easy removal of the block, for example, a horizontal position or a position with the open end of the container slightly below the horizontal. A further feature of the preferred practice of the invention is the release of the frozen block to an elevated platform that is tiltable to cause the discharged ice block to slide by gravity to floor level.

A further object of the invention is to provide convenient means for filling the double wall of the container selectively either with refrigerant or with relatively warm fluid. Preferably two 3-way valves are employed for this purpose, one on the input side of the double wall of the container and the other on the output side.

In one practice of the invention a supply pipe for refrigerant in the form of brine and a second supply pipe for heated brine are connected to the 3-way valve on the input side of the pump and two return pipes for the refrigerant and the heated brine respectively, are connected to the other 3-way valve. In such an arrangement, it is merely necessary to manipulate the two 3-way valves to substitute heated brine for cold brine in the double wall of the container or vice versa.

In another practice of the invention, a volatile refrigerant is used on a refrigerating system that includes a compressor and a condenser. At one adjustment of the two 3-way valves the cold fluid from the condenser is delivered to the double wall of the freezing container; at the alternate adjustment of the two valves, hot fluid from the output side of the compressor is circulated through the double wall of the freezing container.

A still further object of the invention is to provide an automatic cycle of operation to include both freezing of the water and the subsequent release of the block of ice from the container. In general, this object is accomplished by an electrical system that includes solenoids for operating the two 3-way valves and a timer to control energization of the solenoid valves.

The various features, objects and advantages of the invention will be apparent from the following detailed description considered with the accompanying drawings.

In the drawings, which are to be regarded as merely illustrative:

Fig. 1 is a view, partly in front elevation and partly in section, of one embodiment of the invention;

Fig. 2 is a sectional view taken as indicated by the line 2—2 of Fig. 1;

Fig. 3 is a view similar to Fig. 1 illustrating a second embodiment of the invention;

Fig. 4 is an enlarged portion of Fig. 1;

Fig. 5 is an enlarged fragmentary section taken as indicated at the line 5—5 of Fig. 3;

Fig. 6 is a schematic view of a freezing system incorporating either of the first two embodiments of the invention;

Fig. 7 is a side elevation of a rotary assembly incorporating a plurality of freezing containers in a third embodiment of the invention;

Fig. 12 is a diagram showing how the container illustrated by Figs. 8–11, inclusive may be arranged for fluid flow with the various double walls of the container hooked up in parallel with the source of refrigerant;

Fig. 13 is a fragmentary elevational view similar to Fig. 10 showing how the double wall construction of the container may be provided by closely spaced inner and outer sheets interconnected by stay bolts;

Fig. 14 is a transverse section taken as indicated by the line 14—14 of Fig. 13;

Fig. 15 is a schematic view similar to Fig. 6 showing a freezing system that may incorporate any of the various embodiments of the invention;

Fig. 16 is a view similar to Fig. 7 showing how a cam arrangement may be used to open the vent valve of the various containers; and Fig. 17 is a sectional view showing the construction of a vent valve for actuation by the cam shown in Fig. 16.

Figure 8:
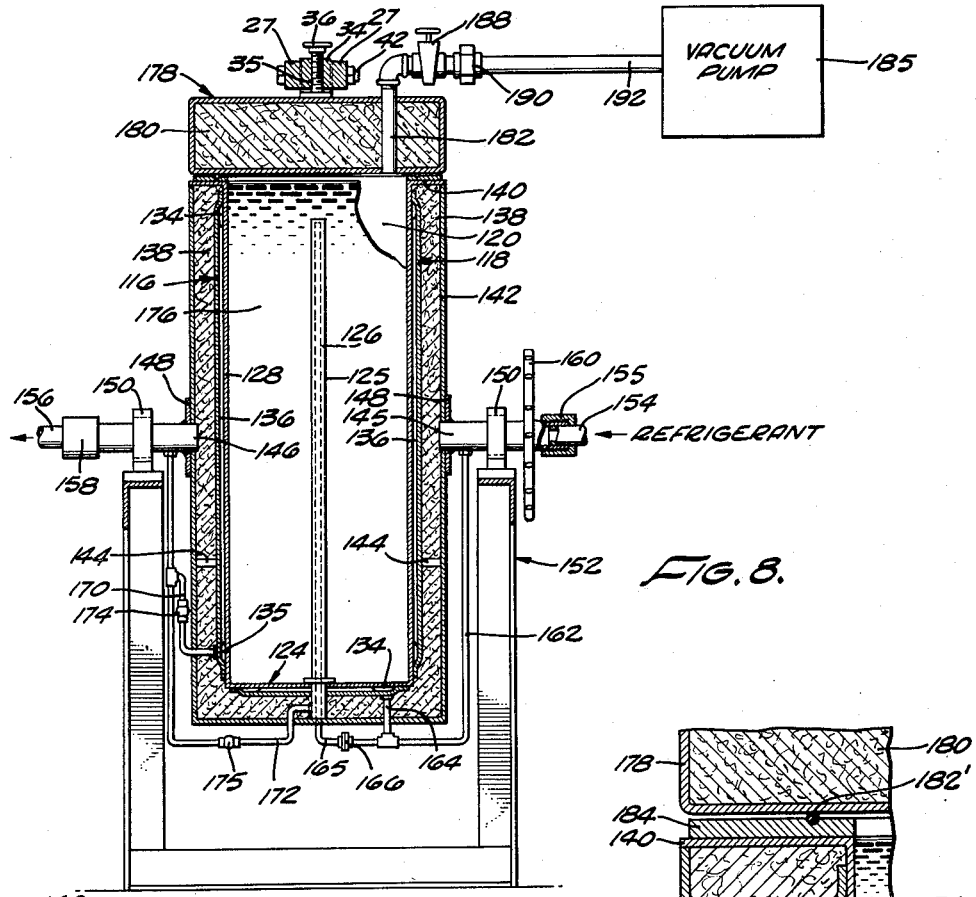
Fig. 8 is a view similar to Fig. 1 illustrating a fourth embodiment of the invention.

The form of the invention illustrated by Figs. 1 and 2 includes what may be termed a double-walled container which comprises in effect an inner container, generally designated by numeral 10, for the liquid that is to be frozen, and an outer container, generally designated by numeral 11, to confine a body of refrigerant surrounding the inner container. The inner container 10 is preferably of the elongated rectangular configuration that characterizes commercial blocks of ice and is open at its upper end. The rims of the two containers are interconnected by an end wall 12 and preferably a similar wall 13 interconnects the two containers at a short distance below the end wall 12. The end wall 12 and the second wall 13 form with the side walls of the two containers a sealed space 14 extending around the rim of the double-walled construction to provide an air pocket that insulates the end wall 12 from the freezing effect of the refrigerant confined by the double walls, i.e., the refrigerant in the space 15 formed by the double walls, which space surrounds the inner container on all four sides and also extends under the inner container.

The open top of the inner container 10 is normally closed by a suitable closure or cover, generally designated 20, which in the present embodiment of the invention is of hollow construction and incorporates a desirable baffle means in the form of a perforated plate 21. The closure 20 has an arcuate top wall 22, and two parallel side walls 23, the bottom or inner wall of the closure being the perforated plate 21. A suitable gasket 24, resting on the end wall 12 around the rim of the inner container 10, cooperates with the marginal portion of the perforated plate 21 to provide a seal between the inner container 10 and the closure 20. The perforations in the plate 21 may be, for example, ½ inch holes at 2 inch spacing center to center.

Any suitable arrangement may be provided for mounting the closure 20 on the double-walled container and to releasably hold the closure in sealing relation to the inner container. In the present construction, for example, two arcuate yokes 27 extend across the top of the closure 20, the two yokes being spaced apart in parallel relation and being pivotally mounted by a cross bolt 28 on suitable bracket means 29. A suitable latch member 30 is pivotally mounted on the opposite end of the two yokes 27 by means of a second cross bolt 31 and is hook-shaped for engagement with a suitable latch lug 32 on the side of the double-walled container. The latch member 30 is preferably formed with a suitable handle 33 for convenient manipulation. The two spaced yokes 27 are connected to opposite sides of a central block 34 into which is threaded a screw 35 to press the closure 20 against the end wall 12 of the double-walled container. The screw 35 has a handle in the form of a hand wheel 36 by means of which the screw may be manually tightened when desired.

The closure 20 may be separate from the described yoke assembly, but preferably is connected thereto with a certain range of movement to avoid interfering with the function of the screw 35. Thus, as best shown in Fig. 2, the closure 20 may be provided with a pair of upwardly extending ears 40 having vertically elongated slots 41 to receive a pair of corresponding cross bolts 42 mounted in the two yokes 27. It is apparent that pivotal movement of the two yokes will carry the closure 20 between open and closed positions and yet will provide sufficient freedom of the closure to respond to adjustment of the screw 35.

It is contemplated that with the double-walled container in upright position, the inner container 10 will be initially filled with water up to a liquid level just below the open end of the container. At this upright position, the perforated baffle plate 21 will be above the water level and will divide the interior of the closed container into a lower compartment initially containing the body of water and an upper compartment inside the closure 20 initially containing the major portion of the body of air that is confined with the water.

The required vent may be conveniently located on the closure 20 and may comprise simply an outlet in the form of a nipple 45 equipped with a ball valve which is generally designated by numeral 46 and is best shown in Fig. 5. The ball valve 46 has a cylindrical body 47 forming a fluid passage 48 providing a tapered valve seat 49 for a ball valve member 50. A suitable pin 51 extending diametrically across the fluid passage 48 limits the movement of the ball member relative to the valve seat. When the closure is in upright position, the ball member 50 gravitates away from the valve seat 49 and rests on the pin 51 as shown in Fig. 5. When the double-walled container is rotated to a position bringing the confined liquid into contact with the ball member 50, the pressure of the liquid moves the ball member to its closed position in the valve seat 49 and as the container turns upside down, the weight of the ball member itself provides further force to maintain the ball member in closed position.

The double-walled container may be mounted in any suitable manner on any suitable support for the required continual change relative to vertical during the freezing process. In this particular embodiment of the invention, the double-walled container is mounted on a pair of short hollow coaxial shafts 52 and 53, the two shafts being rigidly attached to the opposite sides of the double-walled container to serve as trunnions. Each of the two shafts 52 and 53 extends through the wall of the outer container 11 to the wall of the inner container 10, the connection of the shaft with the wall of the outer container 11 being reinforced by a heavy circular plate 57 and the connection between the shaft and the wall of the inner container 10 being reinforced by a thinner circular plate 58. Each of the two hollow shafts 52 and 53 has radial apertures 59 between the walls of the inner and outer containers so that the hollow shaft 52 may serve as a conduit for fluid inflow into the space 15 around the inner container 10 and the hollow shaft 53 may serve as a conduit for outflow from the space. In the particular construction shown in the drawings, the two shafts 52 and 53 are mounted in suitable bearings 60 on a supporting frame 61 that provides clearance for continual rotation of the closed double-walled container.

This first embodiment of the invention may include hollow means extending into the interior of the inner container 10 to provide additional surfaces for heat exchange between the water and the refrigerant. The hollow means may take the form of a pair of upright cylinders 65 that are closed at their upper ends and at their lower ends are in communication with the space 15 that contains the refrigerant. Preferably, effective circulation of refrigerant through the upright cylinders 65 is provided by piping refrigerant directly from the hollow input shaft 52 to the interiors of both cylinders. For this purpose, a pipe 66 (Fig. 1) in the space 15 communicating with one of the apertures 59 of the inflow shaft 52 is connected to a horizontal pipe 67 having two branches 68 extending upwardly inside the two upright cylinders 64 respectively.

The second embodiment of the invention shown in Fig. 3 is largely identical to the first embodiment, as indicated by the use of corresponding numerals to indicate corresponding parts. The difference is merely in the omission of the upright cylinders 65 and the associated pipes 66, 67 and 68.

For the purpose of power of actuation of the rotatable double-walled container, the input shaft 52 may be provided with a suitable sprocket 70 which, as indicated in Fig. 6 is connected by a sprocket chain 71 with a drive sprocket 72 on the shaft of a suitable electric motor 73. Each of the two hollow shafts 52 and 53 terminates at its outer end in a suitable rotary joint 75 for connection with stationary piping.

Any suitable system may be employed for circulating refrigerant through the rotating double-walled container by means of the two hollow shafts 52 and 53. As heretofore stated, preferably such a system not only provides for the circulation of refrigerant fluid but also provides for the circulation of a heated fluid through the double walls of the container at the end of a freezing operation. Fig. 6 shows, by way of example, a system that may be used to circulate the two fluids selectively.

In Fig. 6, a 3-way valve 80 is connected by a pipe 81 to the intake of a suitable centrifugal pump 82, the discharge side of the pump being connected by a pipe 83 with the hollow inflow shaft 52. A second 3-way valve 84 is connected by a pipe 85 with the hollow outflow shaft 53. Suitable refrigerant, for example, refrigerant in the form of cold brine is supplied by a suitable source indicated by the dotted rectangle 88 in Fig. 6. A supply pipe 89 from the cold brine source 88 is connected to the 3-way valve 80 and a return pipe 90 connects the cold brine source with the second 3-way valve 84. A suitable tank 94 serves as a source for hot brine and for this purpose incorporates a suitable electric heater coil 95 that is energized by a circuit including a pair of wires 96. A supply pipe 97 for hot brine connects the hot brine tank 94 with the first 3-way valve 80 and a return pipe 98 connects the hot brine tank with the second 3-way valve 84.

In the positions of the 3-way valves 80 and 84 shown in Fig. 6, energization of the centrifugal pump 82 results in forced circulation of cold brine through the rotary double-walled container and in the alternate positions of the two 3-way valves hot brine from the tank 94 is circulated through the double-walled container. Preferably, the two 3-way valves 80 and 84 are biased or spring-loaded to take the positions shown in Fig. 6 for normally operation in a freezing process but suitable solenoids 100 are connected to the two 3-way valves respectively to operate the valves for hot brine circulation when desired. The two solenoids 100 may be energized under the control of a suitable timer 101 and the motor 73 may also be connected to the timer, as indicated, if such additional motor control is desired.

The preferred practice of the invention includes a tiltable platform 104 which is adapted to receive blocks of ice from the double-walled container in the manner indicated in Fig. 6. One end of the tiltable platform 104 is pivotally mounted by a hinge 105 to one end of an elevated open frame 106. Normally, the platform 104 is held in substantially horizontal position by the piston rod 107 of a hydraulic jack 108 that is suitably mounted on a pivot 109 and is connected to a pair of flexible conduits 110 for operation in a well known manner. After a block of ice 111 has been withdrawn from the double-walled container onto the platform 104, as shown in Fig. 6, the hydraulic jack 108 may be operated to lower the platform to the tilted position shown in dotted lines thereby causing the block of ice to slide downward to floor level.

The operation of the apparatus may be readily understood from the foregoing description. In preparation for a freezing operation, the rotary double-walled container is turned to its upright position and fresh water is poured into the inner container 10 to a level at slight spacing below the rim of the container. The closure 20 is then latched in closed position with the screw 35 sufficiently tightened to place the gasket 24 under sealing pressure. The motor 73 is then energized to rotate the double-walled container continuously and the pump 82 is then energized for fluid circulation. With the two solenoids 100 de-energized, the two 3-way valves 80 and 84 are in the position shown in Fig. 6 for circulation of the cold refrigerant through the double walls of the rotating container. The timer 101 is now set to energize the two solenoids 100 and de-energize the motor 73 after a predetermined interval of time sufficient to cause the fresh water in the rotating double-walled container to freeze into a solid block of ice.

As the elongated rectangular double-walled container rotates about a horizontal axis, the body of fresh water therein continually seeks the lowest part of the available space inside the inner container 10 and the closure 20, the body of water reciprocating from end to end of the available space and thereby causing the body of confined air to reciprocate in the same manner. Thus, the water and air move past each other twice during each rotation as the double-walled container passes through a horizontal position. This reciprocating action is modified by the perforated plate 21 which serves both to retard the movement of the water and to break up the water and air into numerous individual streams.

The vent valve 46 closes automatically to prevent escape of fresh water as the double-walled container rotates out of its upright position and opens automatically each time the double-walled receptacle returns to its upright position. When the vent valve opens in the course of each rotation of the double-walled container, there is a definite hiss indicating the outward passage of air through the vent valve. While the reasons for the effectiveness of the perforated plate 21 and the vent are not fully understood, nevertheless it has been established that the provision of the perforated plate and vent result in a solid, crystal-clear block of ice, whereas the absence of the perforated plate and vent results in the production of unsatisfactroy soft ice of milky appearance. Apparently, the repeated passage of the bodies of water and air through the perforated plate with the perforated plate breaking both bodies into numerous air streams has an important effect in de-aerating the water and apparently the periodic release of the separated air to the atmosphere through the vent to prevent rise in pressure is also important.

With the rotary double-walled container holding 320 lbs. of water and rotating at a speed of two to eight revolutions per minute, and using brine cooled to 10 to 14 degrees F., one freezing cycle produces a 300 lb. cake of ice and over a period of 24 hours the apparatus will produce 3,600 lbs. of clear, crystal ice. This rate of production may be increased, of course, by employing a battery of the double-walled containers, all operated by a single motor. A battery of 6 double-walled containers of this capacity will produce in 24 hours more ice than can be manufactured by a conventional ice making plant having 70 cans submerged in cold brine.

One reason for the rapidity of the freezing operation is that the water is continually agitated. Another reason is the high velocity of flow of refrigerant through the double walls of the container. In this regard, it is important to note that the volume of the space in the double walls is relatively small, being substantially less than half the volume of the interior of the container. The high velocity flow of the refrigerant through the small volume of the space in the double walls means rapid turnover of the refrigerant in the space.

At the end of the predetermined time interval required for completely freezing the body of water in the double-walled container, the timer 101 de-energizes the motor 73 to stop the rotation of the double-walled container and simultaneously the timer energizes the two solenoids 100 to shift the two 3-way valves 80 and 84 to their alternate positions for circulation of heated brine from the tank 94 through the double-walled container. The warm brine quickly thaws the ice adhering to the walls of the inner container 10 to permit the block of ice 111 to be moved from the container onto the platform 104 as shown in Fig. 6. The platform is then lowered by the hydraulic jack to cause the block of ice to slide down onto the floor for removal.

Fig. 7 shows an embodiment of the invention which comprises a rotary structure 112 mounted on a hollow shaft 113. The rotary structure carries a plurality of radially positoned double-walled receptacles 114 of the general character heretofore described. Each of the double-walled containers is in communication with the hollow shaft 113 through suitable piping 115 to permit refrigerant to be circulated through the double walls while the structure is rotating.

Figs. 8 to 11 show a double-walled container having a side wall generally designated 116, an opposite side wall generally designated 118, a third side wall generally designated 120, a fourth side wall generally designated 122 (Figs. 10 and 11) that is opposite the third side wall, and a bottom wall 124 that interconnects the four side walls. Preferably the container is provided with at least one interior upright cylinder or tube 125 with a smaller inner tube or pipe 126 therein, having the same contraction and the same function as the previously mentioned upright cylinders 65 and the down pipes 66 therein.

Figure 10:
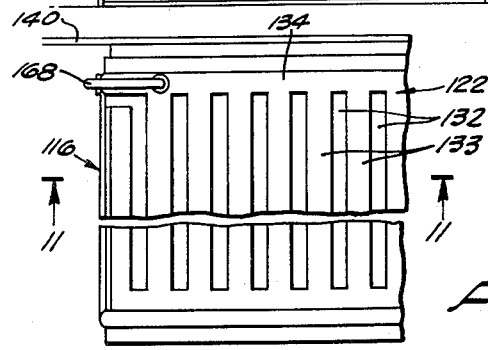
Fig. 10 is a fragmentary side elevational view of the container shown in Fig. 8.

Each of these four side walls and the additional bottom wall is formed by a smooth inner sheet 128 and an outer sheet 130 that is positioned in face-to-face contact with the inner sheet and is offset to cooperate with the inner sheet to form a plurality of fluid passages for the refrigerant. Thus, as shown in Figs. 8 and 10, the outer sheet 130 of each of the five walls of the double-walled container has elongated portions 132 in intimate face-to-face contact with the inner sheet 128 and has other elongated portions 133 that are offset from elongated portions 132 to form elongated fluid passages along the outer surface of the inner sheet 132.

The elongated passages that are formed in this manner in each of the five walls of the container may be of any pattern. In this instance, however, each of the sheets 132 has a transverse elongated portion 134 (Fig. 10) at one end of the sheet to form a transverse passage to serve as an input header for the corresponding wall of the container, a similar transverse elongated portion 135 at the opposite end of the sheet to form a transverse passage to serve as a discharge header. The remaining offset portions 134 form a plurality of parallel longitudinal flow passages 136 extending from the input header to the output header. Thus fluid circulation to each of the five double walls of the container involves inflow into a transverse header passage 134, parallel flow through a plurality of passages 136 from the input header to the corresponding outflow header 135.

Preferably the four side walls and the fifth bottom wall of the container are surrounded by a jacket of insulating material 138 (Fig. 8) which may be of any suitable material known to the art, including expanded plastic material. In the construction shown the double-walled container has a rim flange 140 (Figs. 8 and 9) and an outer housing 142 of the same general configuration as the double-walled container is united with this rim flange to confine the insulating material 138. The housing 142 and the double-walled container may be structurally interconnected at various points by reinforcement members 144 that bridge the space in which the insulating material 138 is confined.

In the same general manner as heretofore described, the double-walled container is mounted on a pair of short hollow coaxial shafts 145 and 146 that are rigidly attached to the opposite sides of the housing 142 to serve as trunnions, the connection of each shaft with the housing being reinforced by a heavy circular plate 148. The two hollow shafts 145 and 146 are mounted in suitable bearings 150 on a supporting frame 152 that provides clearance for continual rotation of the double-walled container. The hollow shaft 145 is connected to a supply conduit 154 by a suitable rotary joint 155 and in like manner the hollow shaft 146 is connected to a return conduit 156 by a second rotary joint 158. Means to rotate or oscillate the double-walled container includes a suitable driven sprocket 160 on the hollow shaft 145.

In this particular practice of the invention, the four side walls and the bottom wall of the double-walled container are connected in series for the flow of refrigerant therethrough and refrigerant is circulated independently through the one or more upright cylinders 125 inside the container. For this purpose a pipe 162 from the hollow shaft 145 has a branch 164 leading to the input header of the bottom wall 124 and has at least one additional branch 165 which is connected to the end of the corresponding upright cylinder 125 at the bottom end thereof. An orifice fitting 166 may be placed in the branch 165 to restrict flow therethrough, if desired, since there is lower resistance to flow through the one or more upright cylinders 125 than through the series of walls of the container.

Figure 11:
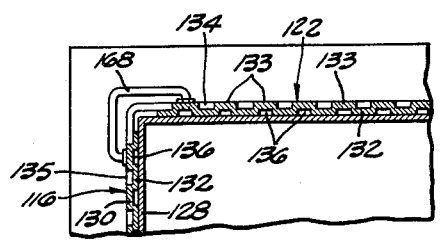
Fig. 11 is a transverse cross-section taken as indicated by the line 11—11 of Fig. 10 showing how the double wall of a container may be formed by a smooth inner sheet and an offset outer sheet that is positioned in face-to-face contact with the inner sheet to form passages for the refrigerant.

The output header of the bottom wall 124 is connected to the input header of one of the four side walls of the double-walled container and the four side walls are connected in series. Thus the flow from the output header of one side wall is delivered to the input header of another side wall. Figs. 10 and 11 show how a short loop of tubing 168, for example, may connect the output header 135 at the upper end of the side wall 122 of the container with the input header 134 of the adjacent side wall 116 of the container.

Thus the flow may be through the bottom wall and the four side walls in series in the following sequence: from the input shaft 145 through pipes 162 and 164 (Fig. 8) to the input header 134 of the bottom wall 124, from the output header 135 of the bottom wall 124 into the lower end of side wall 120, out of the upper end of side wall 120 into the upper end of side wall 118, out of the lower end of side wall 118 into the lower end of side wall 122, and out of the upper end of side wall 122 into the upper end of side wall 116. This arrangement for flow of fluid through the five walls of the double-walled container in series is completed by extending a pipe 170 from the output header 135 at the lower end of the side wall 116 to the hollow output shaft 146. The arrangement for parallel flow through the one or more upright cylinders 125 is completed by extending a pipe 172 from the one or more inner tubes or pipes 126 inside the cylinders 125 to the pipe 170 for communication with the hollow output shaft 146. Preferably check valves 174 and 175 are placed in the two pipes 170 and 172 respectively to prevent back flow through either pipe.

While the double-walled container shown in Fig. 8 may be provided with various closure arrangements for confining a body of water 126 therein, including the closure arrangement of the first described embodiment of the invention, the particular arrangement shown in Fig. 8 includes a closure or cover that is hollow but without any openings. The hollow closure is filled with a body 180 of suitable insulating material, preferably the same as the insulating material 138 of the jacket surrounding the container.

Figure 9:
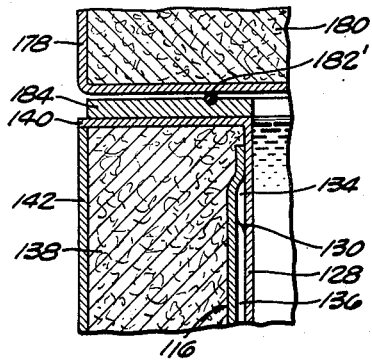
Fig. 9 is a greatly enlarged fragment of Fig. 8 showing the manner in which the closure of the water-confining container is sealed.

The cover 178 is of the same general configuration as the cover 20 of the first embodiment of the invention and is provided with the same arrangement for releasably clamping the closure in tight. Thus the construction shown in Fig. 8 includes the usual pair of yokes 27 connected to opposite sides of a central block 34 into which is threaded a screw 35 to press the closure against the rim flange 140 of the double-walled container. The screw 35 has the usual handle in the form of a hand wheel 36 by means of which the screw may be manually tightened. As best shown in Fig. 9, a gasket 182' of the same character as the familiar O-ring may be used as a seal. For this purpose a relatively thick rim plate 184 is welded to the rim flange 140, this rim plate being formed with a suitable groove to seat the gasket 182'.

In this particular embodiment of the invention, provision is made for evacuating the interior of the double-walled container after the body of water 176 has been placed in the container and after the container has been sealed by closing the cover 178. It is contemplated that the evacuation operation will be carried out in preparation for the freezing operation.

In the arrangement shown in Fig. 8 a suitable vacuum pump 185 is connected to the interior of the double-walled container through the cover 178. For this purpose a short pipe 182 extends through the cover 178 for communication with the interior of the double-walled container and this short pipe is provided with a manually operable cutoff valve 188 on the outer side of the closure. The cutoff valve 188 is connected by a union 190 with a conduit 192 that is connected to the input side of the vacuum pump 185. This conduit 192 may be either a fixed rigid pipe or a flexible conduit.

The manner in which the embodiment of the invention shown in Fig. 8 operates for its purpose may be readily understood from the foregoing description. In a typical operating procedure, after a body of water 176 is placed in the double-walled container and the cover 178 is closed in the sealing manner, the cutoff valve 188 is connected to the vacuum pump 185 by the union 190 and the vacuum pump is operated to evacuate air from the interior of the container. As the pressure inside the container drops air is released from the body of water 176 and is withdrawn from the container. When the evacuation process has proceeded to the desired point, the cutoff valve 188 is closed and is disconnected from the conduit 192 to permit rotation of the double-walled container about the axis of the two hollow shafts 145 and 146.

The double-walled container is then rotated continuously to cause the required turbulence on the part of the enclosed body of water 176 and refrigerant is continually pumped through the spaces formed by the four side walls and the bottom wall of the double-walled container. Since these spaces in the double walls of the container are of restricted cross-sectional dimension, the refrigerant flows at relatively high velocity to create freezing action on the four sides and bottom of the confined body of water. Concurrent flow of refrigerant through the one or more upright cylinders 126 inside the container provides additional freezing action on the interior of the body of water. As a result a crystal clear block of ice forms inside the container in a relatively short period of time.

At the end of this freezing operation the rotation of the double-walled container is stopped and the cutoff valve 188 is opened to remove the pressure differential between the interior of the container and the atmosphere. Relatively warm fluid is then circulated in the same manner as the refrigerant to thaw the block of ice free from the walls of the double-walled container and to thaw the block of ice free from the one or more upright cylinders 125 inside the container. With the cover 178 removed, the block of ice is then removed from the interior of the container, for example, in the same manner as heretofore described.

Fig. 12 shows diagrammatically how the structure shown in Fig. 8 may be constructed for independent parallel flow through the various walls of the double-walled container as well as through the one or more upright cylinders 125 inside the container. In Fig. 12 a pipe 194 from the input shaft 145 has a branch 195 to the lower end of the side wall 120, a second branch 196 to one side of the bottom wall 124 and at least one additional branch 198 to the one or more upright cylinders 125 inside the double-walled container.

A second pipe 200 from the inflow shaft 145 has a branch 202 to the lower end of the side wall 118, a branch 204 to the lower side of the side wall 122 and a third branch 205 to the lower end of the side wall 116. Thus the inflow shaft 145 is connected individually and directly to the four sides and the bottom of the double-walled container as well as to the one or more upright cylinders 125 inside the container. The outflow shaft 146 has a return pipe 206 connected thereto. This return pipe 206 has a branch 207 to receive return flow from the side wall 118, a branch 208 to receive return flow from the side wall 120, a branch 210 to receive return flow from the side wall 116, a branch 212 to receive return flow from the side wall 122, a branch 214 to receive return flow from the bottom wall 124, and at least one branch 215 to receive outflow from the one or more upright cylinders 125 inside the container. Thus the outflow shaft 146 is connected directly to each of the four side walls and bottom wall of the container as well as to the one or more upright cylinders 125 inside the container. It is apparent that this arrangement shown in Fig. 12 with the various walls as well as the one or more upright cylinders all connected in parallel provides for direct delivery of fresh refrigerant to each part of the double-walled container to result in an exceptionally rapid freezing operation.

An important feature of the construction shown in Figs. 8 to 12 is that the total volume of the refrigerant passages in the double walls of the container is only a small fraction of the volume of the interior of the container. Thus with high velocity flow of refrigerant there is a rapid turnover of the refrigerant surrounding the body of water. When all the hollow walls are connected in parallel, the turnover of refrigerant is increased even more, with fresh refrigerant continuously delivered to each of the four sides and bottom of the container.

The purpose of Figs. 13 and 14 is to show how the double walls of a container such as shown in Fig. 8 may be formed by using two flat sheets for each side wall and bottom wall of the container, namely, an inner flat sheet 220 and an outer flat sheet 222, these two sheets being closely spaced together and interconnected by relatively short stay bolts 224. The fact that the two sheets 220 and 222 are relatively close together to form a space of restricted cross-sectional dimension insures relatively high velocity of flow on the part of the refrigerant that is circulated therethrough.

The refrigerant circulated through a double-walled container constructed as indicated by Figs. 8 to 11 or by Figs 13 and 14 may be cold brine and the heated fluid may be heated brine. For this purpose the double-walled container may be employed in the previously described circulation system shown in Fig. 6 with automatic timing of the freezing cycle. If a volatile refrigerant is used, however, a system such as illustrated by Fig. 15 may be employed.

In Fig. 15 the sprocket 160 on the rotary input shaft 145 is connected by the usual sprocket chain 71 to the drive sprocket 72 of the motor 73. Energization of the motor 73 is controlled by the usual timer 101.

In the previously described manner the housing 142 that encloses the double-walled container is mounted adjacent a tiltable platform 104 which is adapted to receive blocks of ice 111 from the container. The tiltable platform 104 is controlled in the manner previously described by means of the usual hydraulic jack 108.

In the construction shown in Fig. 15, the rotary joint 156 on the outflow side of the double-walled container is connected by a pipe 225 and a check valve 226 with the input side of a compressor 228. The output side of the compressor 228 is connected by a pipe 230 and a normally open manually cutoff valve 232 with one port of a 3-way valve 234. The 3-way valve 234 is actuated by a solenoid 235 under control of the timer 101. A second port of the 3-way valve 234 is connected by a pipe 236 with a second 3-way valve 238. The third port of the 3-way valve 234 is connected by a pipe 240 and a check valve 242 to a water cooled condenser, 244.

The output side of the condenser 244 is connected by a pipe 245 to four devices in series, namely, a normally open manual cutoff valve 246, a strainer 248, a normally open electrically actuated valve 250 that is controlled by the timer 101 and, finally, an expansion valve 252 which is controlled in a well known manner by a thermostat or thermo bulb 254 on the outflow side of the double-walled container. The expansion valve 252 is connected by a pipe 255 with a second port of the second 3-way valve 238, which valve is actuated by a solenoid 256 under control of the timer 101. The third port of the 3-way valve 238 is connected by a pipe 258 to the rotary joint 155 on the inflow side of the double container.

The operation of the system shown in Fig. 15 may be readily understood. In preparation for a freezing operation, the rotary double-walled container is turned to its upright position and fresh water is poured therein to a level slightly below the rim of the container. The cover 178 is closed and the container is evacuated by the vacuum pump 185 in the manner heretofore described. When the evacuation operation is completed, the cutoff valve 188 is closed and is then disconnected from the vacuum pump. With the evacuated double-walled container disconnected from the vacuum pump, the motor 73 is energized to rotate the container with the two 3-way valves 234 and 238 in the positions shown in Fig. 15. It is apparent that that system operates with a well known refrigeration cycle in which the volatile refrigerant in vapor form from the outflow side of the double-walled container is delivered to the compressor 228 and the refrigerant is discharged under pressure by the compressor into the condenser 244. From the condenser 244 the liquid refrigerant passes through the open valve 250 to the expansion valve 252, which expansion valve releases the refrigerant into the inflow side of the double-walled container.

After a predetermined interval of time sufficient to cause the fresh water in the double-walled container to freeze into a solid block of ice, the timer 101 energizes the two solenoids 235 and 256 and de-energizes the motor 73. The energization of the solenoid 235 rotates the 3-way valve 234 to a position placing the output side of the compressor 228 in direct communication with the pipe 236 and in like manner the energization of the solenoid 256 rotates the 3-way valve 238 to place the pipe 236 in direct communication with the pipe 258. Thus the refrigerant space in the double-walled container is placed in series with the compressor 228 with the hot gas from the output side of the compressor circulated directly to the refrigerant space of the double-walled container to thaw the ice block in the container sufficiently to release the ice block.

The de-energization of the motor 73 at the end of the freezing cycle automatically stops the double-walled container in the slightly downwardly tilted position shown in Fig. 15 so that the release of the ice block 111 by the thawing operation causes the ice block to slide down onto the platform 104 as shown. The platform 104 is then lowered by the hydraulic jack 108 to cause the block of ice to slide down onto the floor for removal.

Fig. 16 shows an embodiment of the invention which is, for the most part, identical with the construction shown in Fig. 7 as indicated by the use of corresponding numerals to indicate corresponding parts. Thus the rotary structure 112 carries a plurality of radially positioned double-walled containers 114 of the character heretofore described. Each of the double-walled containers is in communication with a hollow shaft 113 through suitable piping 115 to permit refrigerant to be circulated through the double walls while the structure is rotating.

The embodiment shown in Fig. 16 differs from the embodiment shown in Fig. 7 in the substitution of a mechanically actuated vent valve 260 for the previously described gravity-actuated valve 50. Each of the vent valves 260 is normally closed but is momentarily opened by an overhead cam 262 as the corresponding double-walled container passes through the upper portion of its orbit where the container is upright.

The vent valve 200 on each of the double-walled containers may be constructed, for example, as shown in Fig. 17. In this construction a suitable nipple 264 is welded to the closure or cover 20 in communication with the interior thereof. A cap 265 threaded onto the nipple 264 has a vent passage 266 therein which is normally closed by a valve member 268 on a valve stem 270. A button 272 threaded onto the outer end of the valve stem has a radial flange 274 and a suitable spring 275 is in compression between this radial flange and the cap 265. Thus the spring 275 normally holds the valve member 268 in position to close the vent passage 266. When the double-walled container approaches upright position the button 272 is moved against the stationary cam 262 to cause the vent passage to be opened in opposition to the pressure of the spring 275.

Our description herein of preferred practices of the invention will suggest to those skilled in the art various changes, substitutions, and other departures from our disclosure that properly lie within the spirit and scope of the appended claims.

We claim:

1. In an apparatus for freezing large blocks of ice, the combination of: a large container to hold a body of water, said container being open at one end, said container having a smooth inner wall on each of its four sides and an outer wall having numerous elongated inwardly offset portions in contact with said inner wall whereby the two walls form numerous passages for flow of refrigerant therethrough, the passages of each side wall of the container comprising an inflow header passage, an outflow header passage and numerous passages interconnecting the two header passages; a closure for said open end of the container to confine said body of water therein; hollow shaft means to support said container for rotation; means including said hollow shaft means for forced circulation of refrigerant through said passages formed by the outer and inner walls of the container; and power means to rotate the container about the axis of said shaft.

2. An apparatus as set forth in claim 1 in which the outflow header passage of one of said side walls of said container is connected to the inflow header passage of another side wall of the container to place said two said walls in series with respect to the flow of refrigerant through the passages thereof.

3. An apparatus as set forth in claim 1 in which said hollow shaft means provides a main inflow passage and a main outflow passage; and in which the inflow header passages of at least two sides of said container are connected directly to said main inflow passage and the outflow passage headers of the same sides are connected directly to said main outflow passage whereby said two sides are connected in parallel with respect to the flow of refrigerant therethrough.

4. In an apparatus for making large blocks of ice, the combination of: a large container for a body of water, said container being open at one end and having double walls providing space for confining refrigerant around the body of water, a closure for said open end of the container; hollow shaft means to support said container for rotation; means including said hollow shaft means for forced circulation of refrigerant through said space formed by the double walls of the container and to keep the space full of refrigerant, said space being narrow in cross-section for rapid flow of the refrigerant therethrough, with the volume of the space substantially less than half the volume of the interior of the container; power means to rotate the container about the axis of said shaft means; and means to evacuate air from said container while the body of water is confined therein to maintain the interior of the container under a vacuum while said refrigerant is being circulated through the space formed by the double walls of the container.

5. In an apparatus for making large blocks of ice, the combination of: a large container for a body of water, said container being open at one end and having double walls providing space for confining refrigerant around the body of water, a closure for said open end of the container; hollow shaft means to support said container for rotation; means including said hollow shaft means for forced circulation of refrigerant through said space formed by the double walls of the container and to keep the space full of refrigerant, said space being narrow in cross-section for rapid flow of the refrigerant therethrough, with the volume of the space substantially less than half the volume of the interior of the container; power means to rotate the container about the axis of said shaft means; means providing an evacuation passageway connected to the closure of said container; a cut-off valve in said passageway; and a vacuum pump adapted for releasable connection with said passageway.

6. In an ice-making machine including container means having evacuation passageway means therethrough, the freezing method comprising the steps of: partially filling said container with water; sealing each and every opening into said container other than said evacuation passageway means, whereby said container is made airtight but for said evacuation passageway means; withdrawing air from said container through said evacuation passageway means while said container is sealed as aforesaid and for a length of time to cause the pressure in said container to fall substantially below atmospheric pressure; sealing said evacuation passageway means to make said container completely airtight at the same time the pressure within said container is maintained substantially below atmospheric pressure by withdrawal of air therefrom as aforesaid; repeatedly changing the position of said container to place its ends alternately uppermost while the pressure within said container is substantially below atmospheric pressure; and refrigerating said water to freeze it not only while the position of said container is repeatedly changed as aforesaid, but also while the pressure within said container still is substantially below atmospheric pressure.

References Cited in the file of this patent

UNITED STATES PATENTS

| | | |
|---|---|---|
| 1,703,472 | Buhre | Feb. 26, 1929 |
| 2,287,255 | Langgaard | June 23, 1942 |
| 2,287,256 | Langgaard | June 23, 1942 |
| 2,361,137 | Terry | Oct. 26, 1944 |
| 2,400,517 | Kirkpatrick | May 21, 1946 |
| 2,414,264 | Kirkpatrick | Jan. 14, 1947 |
| 2,542,892 | Bayston | Feb. 20, 1951 |
| 2,060,427 | Kirkpatrick | Aug. 12, 1952 |
| 2,643,524 | Wilbushewich | June 30, 1953 |
| 2,662,273 | Long | Dec. 15, 1953 |
| 2,691,871 | Saler | Oct. 19, 1954 |
| 2,726,516 | Bayston | Dec. 13, 1955 |
| 2,737,785 | Morton | Mar. 13, 1956 |

UNITED STATES PATENT OFFICE

CERTIFICATE OF CORRECTION

Patent No. 2,942,430           June 28, 1960

Henry C. Rising et al.

It is hereby certified that error appears in the printed specification of the above numbered patent requiring correction and that the said Letters Patent should read as corrected below.

Column 4, line 15, for "designed" read -- designated --; column 6, line 26, for "normally" read -- normal --; column 12, line 61, for "200" read -- 260 --; column 13, line 31, for "said", second occurrence, read -- side --.

Signed and sealed this 13th day of December 1960.

(SEAL)
Attest:

KARL H. AXLINE
Attesting Officer

ROBERT C. WATSON
Commissioner of Patents